United States Patent [19]

Härtel et al.

[11] Patent Number: 4,618,128
[45] Date of Patent: Oct. 21, 1986

[54] TWO-CHAMBER ENGINE BEARING WHICH HAS HYDRAULIC DAMPING

[75] Inventors: Volker Härtel, Germering; Dieter Theisen, Unterschleissheim, both of Fed. Rep. of Germany

[73] Assignee: Metzeler Kautschuk GmbH, Munich, Fed. Rep. of Germany

[21] Appl. No.: 659,708

[22] Filed: Oct. 11, 1984

[30] Foreign Application Priority Data

Oct. 11, 1983 [DE] Fed. Rep. of Germany ....... 3336966

[51] Int. Cl.$^4$ .............................................. F16F 9/34
[52] U.S. Cl. ................................ 267/140.1; 188/320; 267/122
[58] Field of Search ................ 188/320; 267/140.1, 267/151, 113, 122, 123, 64.15, 64.19, 64.23, 64.27

[56] References Cited

U.S. PATENT DOCUMENTS

| | | | |
|---|---|---|---|
| 2,535,080 | 12/1950 | Lee | 267/140.1 |
| 4,277,056 | 7/1981 | Ticks | 267/140.1 |
| 4,467,899 | 8/1984 | Molders et al. | 188/320 |
| 4,483,521 | 11/1984 | Kakimoto | 267/140.1 X |

FOREIGN PATENT DOCUMENTS 0115417 8/1984 European Pat. Off. ......... 267/140.1

*Primary Examiner*—Duane A. Reger
*Attorney, Agent, or Firm*—Herbert L. Lerner; Laurence A. Greenberg

[57] ABSTRACT

The invention relates to a two-chamber engine bearing, in particular for motor vehicles, which has hydraulic damping, the liquid-filled chambers of which have rubber elastic peripheral walls and are connected to each other by a line which is provided in the rigid, elastically-mounted intermediate plate. To improve the damping, the intermediate plate has, according to the invention, an extended cavity which has an approximately rectangular longitudinal cross-section in the area of the middle plane thereof, the length and width of the cavity being many times its height and the cavity being connected to the upper chamber at one end by a vertical passage and connected to the lower chamber at the other end by a corresponding passage.

11 Claims, 3 Drawing Figures

TWO-CHAMBER ENGINE BEARING WHICH HAS HYDRAULIC DAMPING

The present invention relates to a two-chamber engine bearing, in particular for motor vehicles, which has hydraulic damping, the liquid-filled chambers of which have rubber-elastic peripheral walls and are connected to each other by a line which is provided in an intermediate plate.

An engine bearing of this type is known, for example, from DE-OS No. 30 19 337. According to this patent, a spiral channel is provided in the intermediate plate, the ratio of the length and diameter of which should be greater than 4 because a laminar flow is only possible above such a ratio in a channel which has a circular cross-section. The advantage of a long channel of this type (in contrast to the hitherto conventional choking openings in the intermediate plate) is that the liquid column standing in the channel virtually acts as a neutralizing mass and thus exerts an optimum damping effect on vibrations which have a large amplitude and a low frequency. The greatest damping effect is produced if the liquid column which is trapped in the channel resonates with the exciting frequency.

Thus, this means that an important parameter for the level of damping to be reached is the liquid mass which is contained in the channel.

Thus the present invention sets out to provide an engine bearing, the damping capacity of which has been still further improved and which may be easily adapted to the requirements of each individual case.

This object is achieved according to the present invention using the above-mentioned prior art as a base and by providing the intermediate plate with an extended cavity which has an approximately rectangular longitudinal section in te area of its middle plane, the length and breadth of which cavity is many times that of its height and which is connected to the upper chamber by a vertical passage at one end and to the lower chamber by a corresponding passage at the other end.

If the line is designed as a flat hollow chamber in this way, which virtually spans the entire surface of the intermediate plate, a substantially greater quantity of liquid may be contained inside this line, this modifying the flow resistance in contrast to a channel which has a circular cross-section and a substantially smaller channel volume.

Seen as a top view, the cavity itself may be rectangular or approximately oval or circular in shape.

For ease of production, it is effective if the intermediate plate is divided in its horizontal middle plane thereof and if each plate half has corresponding congruent recesses for the purpose of forming the cavity in the parting plane thereof and each has a passage. The passage may be slit-shaped and span the entire width of the cavity. According to one particular embodiment, the passages may also have circle-segment-shaped sections seen in top view, and their arc-shaped side may be directly connected to the inside periphery of the bearing chambers.

BRIEF DESCRIPTION OF THE DRAWINGS

The structure and operation of embodiments according to the present invention are explained in more detail with reference to the diagrammatical drawings.

Figure 1:
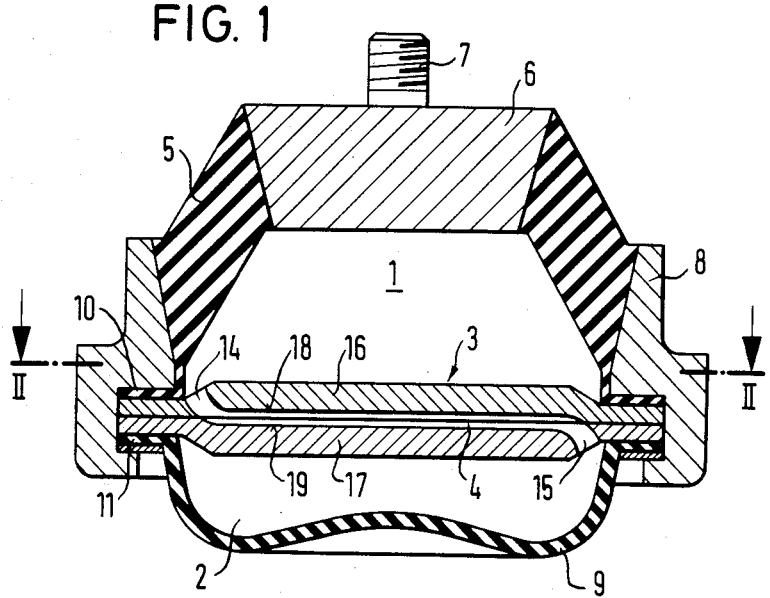
FIG. 1 shows a longitudinal section through a two-chamber engine bearing.

As can be seen from FIG. 1, the engine bearing substantially comprises an upper chamber 1 on the side of the engine and a lower chamber 2, which are hydraulically connected to each other by a line in the form of a cavity 4 which passes through the intermediate plate 3 which has yet to be described. The upper chamber 1 is formed by a strong-walled, hollow, conical chamber wall 5 of a rubber elastic material, the upper face of which chamber wall is connected in an adhesive manner to a bearing plate 6 with a holding bolt 7 on the side of the engine, and the bottom of which is connected in an adhesive manner to the mounting flange 8 as a connection to an abutment which is not shown in detail. The lower chamber 2 is formed by a chamber wall 9 which may, for example, be cup-shaped and is also of rubber-elastic, albeit softer, material, which is connected in an adhesive manner with the flange 8.

Both chambers 1 and 2 are filled with a hydraulic liquid, generally a mixture of glycol and water.

The intermediate plate 3 is mounted in an elastic manner at its peripheral region inside the mounting flange 8 by the rubber linings 10 and 11 which are drawn in, with the result that the intermediate plate can simultaneously vibrate with the high-frequency vibrations which have caused a small amplitude which produce a flow of liquid between the two chambers 1 and 2. This thereby guarantees good acoustic insulation, so that a transmission of structure-borne noise from the engine to the body work of the vehicle is to a large extent eliminated.

If vibrations occur which have a relatively large amplitude and a relatively low frequency, there is a dynamic build-up of pressure in the chamber, thereby initiating a flow of liquid through the line 4 in the intermediate plate 3 from chamber 1 into chamber 2.

Figure 2:
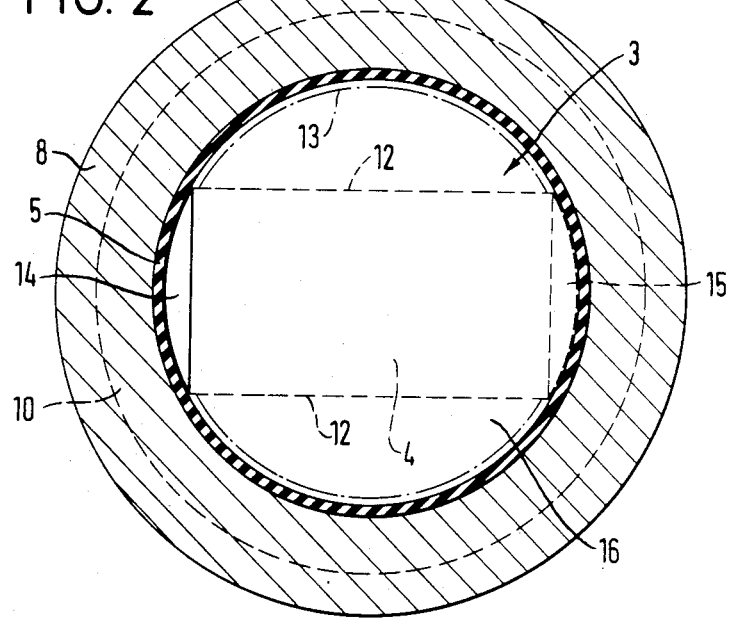
FIG. 2 shows a cross-section through this bearing along the line of intersection II—II according to FIG. 1 looking onto the intermediate plate.

While this liquid is being transferred, damping is caused by the "displacement" of the quantity of liquid contained in the line 4, the level of damping increasing with the quantity of liquid to be displaced and the increased friction loss which is determined by the shearing rate and the viscosity. The line is thus in the form of a flat cavity 4 lying inside the intermediate plate 3, which cavity has an approximately rectangular cross-section in the longitudinal direction, and in accordance with the top view of FIG. 2 may be rectangular in shape as can be seen by the dotted line 12. The length and breadth of the cavity 4 is several times that of its height so that a large quantity of liquid may be accommodated. The planar extension of the cavity 4 in a horizontal direction is thus determined only by the active surface of the intermediate plate 3 with the result that the maximum outer contour of the cavity 4 may be circular, running approximately along the dotted line 13 in FIG. 2.

The cavity is thus connected by a vertical or slit-shaped passage 14 to the upper chamber 1 and by a corresponding passage 15 to the lower chamber 2. These passages 14 and 15 are effectively arranged in the outer region of the cavity 4 so that as large a volume of liquid as possible is sealed between them and they may have a circle-segment-shaped cross-section according to the embodiment which is shown and may be directly connected to the inside contour of chambers 1 and 2.

For ease of production, as can be seen from FIG. 1, the intermediate plate 3 is divided in its horizontal middle plane into an upper plate half 16 and a lower plate half 17, each plate half 16 and 17 respectively having corresponding congruent recesses 18 and 19 respectively in the parting plane thereof, which form the cavity 4 when the plate halves are placed together. Moreover, the upper passage 14 is cut into the upper half of the plate 16 and the lower passage 15 is cut into the lower half of the plate 17.

By designing the connecting line as a flat hollow chamber, a substantially larger quantity of liquid may be stored, in comparison with hitherto conventional channels which had circular cross-section while maintaining the same flow resistance. Moreover, the volume of the cavity may be greatly varied by increasing the surface and/or the height, so that it is possible to a large extent to optimize the damping effect and to conform to the corresponding frequencies.

Figure 3:
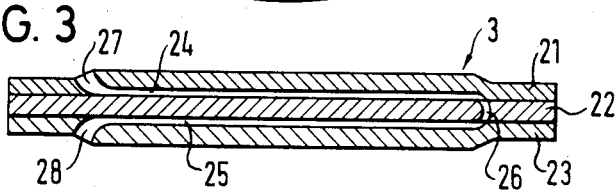
FIG. 3 shows a longitudinal section through an intermediate plate which has a meander-shaped cavity.

A further possibility for increasing the volume of the cavity consists of designing it in the shape of a meander, as can be seen in FIG. 3. Correspondingly, the intermediate plate comprises three individual plates, 21, 22 and 23, both the partial cavity 24 between plates 21 and 22 and the partial cavity 25 between plates 22 and 23 being formed by corresponding recesses in the plates. Both partial cavities 24 and 25 are connected to each other at one end by the channel 26 which passes through the middle plate 22 and are connected to the bearing chamber 1 at the other end by the passage 27 in the upper plate 21 and are connected to the bearing chamber 2 by the passage 28 in the lower plate 23.

Of course, it is also possible to further increase the volume of the cavity in the intermediate plate by stacking more than three plates on top of each other and increasing the bends of the meander to thereby achieve an improved adaptation to the conditions required in each case.

We claim:

1. Two-chamber engine bearing with hydraulic damping, comprising rubber-elastic peripheral walls, a rigid, elastically-mounted intermediate plate defining an upper liquid-filled chamber and a lower liquid-filled chamber along with said peripheral walls, said intermediate plate having a cavity formed therein interconnecting said chambers with a substantially rectangular longitudinal section in vicinity of the central plane thereof and a length and width being many times the height thereof, said intermediate plate having a first vertical passage formed therein at one end of said cavity leading from said cavity to said upper chamber and a second vertical passage formed therein at the other end of said cavity leading from said cavity to said lower chamber.

2. Two-chamber engine bearing according to claim 1, wherein said cavity is rectangular when seen in a top view.

3. Two-chamber engine bearing according to claim 1, wherein said cavity is substantially oval when seen in a top view.

4. Two-chamber engine bearing according to claim 1, wherein said cavity is substantially circular when seen in a top view.

5. Two-chamber engine bearing according to claim 1, wherein said intermediate plate is divided along a horizontal central parting plane thereof forming two plate halves, each plate half having a corresponding congruent recess formed therein at said parting plane forming said cavity, and each of said plate halves having a respective one of said vertical passages formed therein.

6. Two-chamber engine bearing according to claim 3, wherein said vertical passages are slit-shaped and span the entire width of said cavity.

7. Two-chamber engine bearing according to claim 4, wherein said vertical passages are slit-shaped and span the entire width of said cavity.

8. Two-chamber engine bearing according to claim 1, wherein said vertical passages each have a circle segment-shaped cross-section, when seen in a top view, and an arcuate side directly connected to the inner periphery of a respective one of said bearing chambers.

9. Two-chamber engine bearing according to claim 1, wherein said cavity is meander-shaped and includes several interconnected partial cavities lying one on top of another, each of said partial cavities having an end connected to a respective one of said bearing chambers.

10. Two-chamber engine bearing according to claim 9, wherein said intermediate plate is formed of at least three individual plates including a middle plate, each of said plates having a surface facing another of said plates, each of said surfaces having a respective one of said partial cavities formed therein, said middle plate having a vertical channel formed therein interconnecting said partial cavities, and said partial cavities being connected to said bearing chambers at said ends thereof by said vertical passages.

11. Two-chamber engine bearing with hydraulic damping, comprising rubber-elastic peripheral walls, a rigid, elastically-mounted intermediate plate defining an upper liquid-filled chamber and a lower liquid-filled chamber along with said peripheral walls, said intermediate plate having a cavity formed therein interconnecting said chamber with a substantially flat, slot-shaped, rectangular shape as seen in a plan view, in a cross section and in a longitudinal section and a length and width being many times the height thereof, said intermediate plate having a first vertical passage formed therein at one end of said cavity leading from said cavity to said upper chamber and a second vertical passage formed therein at the other end of said cavity leading from said cavity to said lower chamber.

* * * * *